(12) United States Patent
Black et al.

(10) Patent No.: US 8,228,832 B2
(45) Date of Patent: Jul. 24, 2012

(54) USSD TRANSPORT METHOD AND DEVICE

(75) Inventors: Gregory R. Black, Vernon Hills, IL (US); Mark J. Carlson, Round Lake, IL (US); Valeriy F. Marchevsky, Vernon Hills, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 305 days.

(21) Appl. No.: 12/693,268

(22) Filed: Jan. 25, 2010

(65) Prior Publication Data
US 2011/0182220 A1 Jul. 28, 2011

(51) Int. Cl.
G08C 17/00 (2006.01)
H04W 4/00 (2009.01)
H04B 1/16 (2006.01)
(52) U.S. Cl. ............... 370/311; 370/329; 455/343.5
(58) Field of Classification Search .......... 370/311, 370/328, 329; 455/343.5
See application file for complete search history.

(56) References Cited

U.S. PATENT DOCUMENTS

| | | | |
|---|---|---|---|
| 6,892,308 | B1 | 5/2005 | Medvinsky |
| 7,324,443 | B2 | 1/2008 | Chuah et al. |
| 7,532,890 | B2 | 5/2009 | Davies et al. |
| 7,848,358 | B2 | 12/2010 | LaDue |
| 2008/0045277 | A1 | 2/2008 | Plestid et al. |
| 2008/0205379 | A1* | 8/2008 | Naqvi ............... 370/352 |
| 2011/0131321 | A1 | 6/2011 | Black et al. |
| 2011/0185202 | A1 | 7/2011 | Black et al. |

FOREIGN PATENT DOCUMENTS
WO 2006059206 A1 6/2006

OTHER PUBLICATIONS

3GPP TS 22.090 V7.0.0 (Jun. 2006); Technical Specification Group Services and System Aspects; Unstructured Supplementary Service Data (USSD)—Stage 1 (Release 7); 9 pages.
Fielding, et al.; Hypertext Transfer Protocol—HTTP/1.1; Jun. 1999; 114 pages.
ETSI; ETS 300 549: Digital Cellular Telecommunications System (Phase2); Unstructured Supplementary Service Data (USSD)—Stage 2; (GSM 03.90); Aug. 1996; 37 pages.
Patent Cooperation Treaty, International Search Report and Written Opinion of the International Searching Authority for International Application No. PCT/US2010/061720, Mar. 9, 2011, 10 pages.
Otso Kassinen et al.: "Using Unstructured Service Supplementary Data Signaling for Mobile Peer-To-Peer Invocations", The 12th International Symposium on Wireless Personal Multimedia Communications (WPMC 2009), Sep. 7-10, Sendai, Japan, all pages.

* cited by examiner

*Primary Examiner* — Ronald Abelson
(74) *Attorney, Agent, or Firm* — Gary J. Cunningham

(57) ABSTRACT

An USSD transporting method (200) and mobile computing device (410) are described. The method (200) can include the steps of: providing a data pushing operation (210) over a universal supplementary services data (USSD) channel from the application server to the mobile device client; and initiating a data pulling operation (220) over an internet protocol (IP) channel by the mobile device client, in response to the pushing operation. Advantageously, for short data transfers, such as application server push notifications, USSD messages require lower power drain than packet data, due to the longer time to transition to an RRC idle state after the data transfer is completed. Also, push notifications can be sent over USSD without an open IP session, thereby saving the client from having to maintain a persistent IP session, while employing alternate pulling transport means such as wireless LAN which require lower power drain than a wide area network.

19 Claims, 4 Drawing Sheets

USSD TRANSPORT METHOD AND DEVICE

FIELD OF THE INVENTION

The field of the invention relates to an USSD transport method and device, and more particularly, to mobile computing devices in communication with application servers, to reduce energy drain.

BACKGROUND OF THE INVENTION

Mobile computing devices, such as mobile or wireless stations, cell phones, radios, laptops, wireless communication devices and the like, operate with a power storage device with a limited energy supply, such as a battery, fuel cell or the like. A mobile computing device needs a power source and, in many cases, this power source is a battery. For instance, cellular phones use various types of batteries to operate. The amount of time a mobile station can typically operate before the energy of the battery is consumed (which is often referred to as "battery life"), is often an important criteria that consumers use in choosing one brand or type of mobile computing device over another brand. The terms battery, energy storage device and power storage device are used interchangeably herein.

While the power storage device is generally rechargeable, it may not be convenient or even possible for a user to recharge. Accordingly, there is a need to maximize the useful operational time of a wireless computing device.

Additionally, different operating environments can cause the user to be surprised and/or frustrated when the battery runs out much more quickly than would typically be expected by the user. Thus, a variation or unexpected short battery life is very undesirable from a user perspective.

This is a particularly relevant problem for mobile computing devices running applications supported by an applications server because of the power drain due to the wireless data exchange between the mobile device and the server, since each upload or download causes the consumption of energy in the mobile device and server. The problem is especially acute in the mobile device, which is typically battery powered and has finite energy available.

Accordingly, it is desirable to improve battery life of mobile devices operating on any network. For example, in connection with the operation of a 3G network, a mobile device is typically in a persistent internet communication with an application server. It is desirable to reduce the inefficiencies of sending and receiving very short messages on the 3G network.

As background, persistent internet connection methods were adopted for general use with hypertext transfer protocol (HTTP) version 1.1 some time ago. Prior to persistent connections, a separate TCP connection was established to fetch each URL, increasing the load on HTTP servers and causing congestion on the Internet. With persistent TCP/IP communications a TCP/IP connection remains open unless the server or client signals the connection to close. In practice, servers and network gateways maintain a time-out period after which they will no longer maintain an inactive connection. It is common practice for mobile devices in persistent communication with an application server to employ a periodic keep-alive message, also called heartbeat, to maintain the persistent connection beyond the timeout period.

In order to reduce energy consumption in the mobile device due to reception of unwanted TCP/IP messages, mobile devices generally employ firewall techniques whereby TCP/IP sessions cannot be initiated except by the mobile device itself. The application server is typically only able to send application related data to the mobile client if a TCP/IP connection is persistent and maintained active. Typically the mobile client will open a TCP/IP session at the time the application is started or the device powers up, and periodically sends keep alive messages to prevent the server or network gateway from closing the session. The server will send, or "push", over the TCP/IP connection frequent notification messages which indicate a change in the application state or the availability of new data. In response the mobile device may request, or "pull", related application data from the server.

The keep-alive and notification messages typically contain on the order of 100 bytes of data. Sending and receiving such small messages on a normal 3G data channel has an inefficient and undesirable impact on power dissipation in a mobile device. This is because the radio resource controller (RRC) on the 3G networks requires the device to transition from the idle state, to a fast associated control channel (FACH) state having high current drain, and then to a dedicated channel (DCH) state also having high current drain, before sending the 100 bytes of data. The RRC then keeps the mobile in the DCH state and FACH states for typically 6 to 16 seconds. For example, on a typical 3G handset the idle state current drain is about 2 mA, the DCH/FACH state current drain is about 200 mA. On a T-Mobile network, a device and network remains in the DCH/FACH state for approximately 6 seconds. On an AT&T network, the device remains in the DCH/FACH state for approximately 16 seconds. The amount of battery capacity consumed by a handset, due to the 100 byte message is 0.33 mAh on T-Mobile and 0.89 mAh on AT&T. For a light data user, keep-alive and notifications messages are typically exchanged on the order of 12 times per hour (for a light user), thus causing additional current drain of about 3.9 mA on T-Mobile and 10.7 mA on AT&T. As can be seen, the effect on battery life can be significant.

Maintaining an active TCP/IP session for receiving "push" notifications has another side-effect, in it makes the mobile vulnerable to unwanted traffic, such as spurious IP messages from unknown sources, or malicious attacks.

It would be considered an improvement in the art, if the energy drain due to keep-alive and notification messages from application servers, as well as spurious or malicious messages from unknown sources, could be reduced or eliminated. It would also be considered an improvement in the art, if current drain could be minimized in the above examples, thereby extending battery life in a mobile device.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve the understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method is described that reduces or eliminates keep-alive messages from a mobile device client running an application in synchronous communication with an application server, and reduces the energy drain due to notification messages from an application server to a mobile device client.

Figure 1:
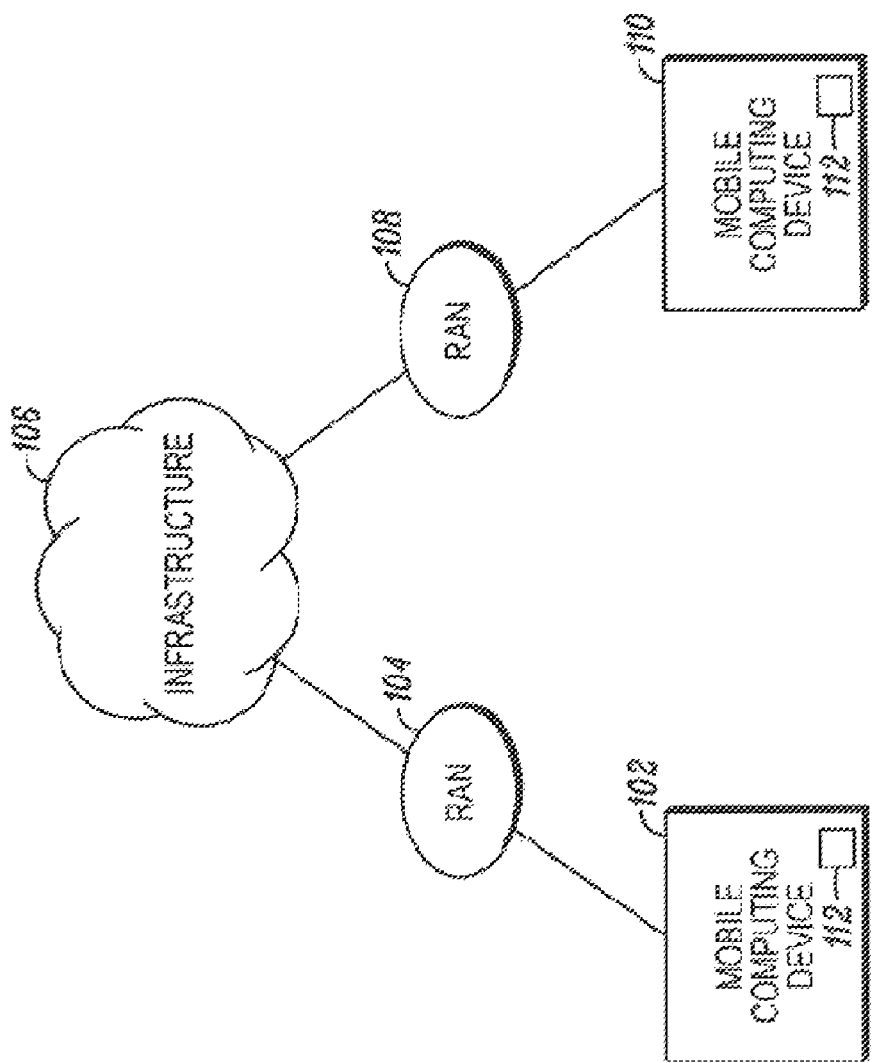
FIG. 1 is a block diagram of a system showing mobile computing devices with USSD management modules, to reduce energy drain, according to the present invention.

Referring to FIG. 1, one example of a system with efficient server communication for increasing the battery life of a mobile computing device, is described. The system includes a first mobile computing device 102 that is coupled to a first Radio Access Network (RAN) 104. The first RAN 104 is coupled to a communication infrastructure 106. The infrastructure can include a plurality of application servers, for running various applications, as detailed below. A second mobile computing device 110 is coupled to a second RAN 108. The second RAN 108 is also coupled to the infrastructure 106. The principles described herein may be applied to a variety of wide area network systems, such as 2G and 3G networks, long-term evolution (LTE), ultra mobile wideband (UMB), 802.16e & m, High Rate Packet Data (HRPD) systems, or systems such as the Universal Mobile Telecommunication System (UMTS), as well as wireless local area networks, personal area networks, and wired networks.

The mobile computing devices 102 and 110 may be any type of mobile wireless device. As used herein, a mobile computing device also means a mobile station, mobile device, wireless communication device, wireless computing device, mobile device client, mobile or wireless station, cell phone, radio, laptop and the like, such terms may be used interchangeably herein.

The mobile computing devices 102 and 110 each include a USSD management module 112 for coordinating synchronous communications between application server poling applications, as detailed below. For example, the mobile computing devices 102 and 110 may be cellular telephones, pagers, radios, mobile stations, personal computers, or personal digital assistants. As should be understood by those skilled in the art, other examples of mobile computing devices are possible.

The RAN's 104 and 108 may be any device or combination of devices that allow the mobile computing devices 102 and 110 to have access to the communication infrastructure 106. For example, the RANs 104 and 108 may include access points, base stations, base station controllers, antennas, and other types of devices that facilitate these communications.

The communication infrastructure 106 preferably includes devices and/or networks that allow communications to be made between mobile stations. For example, the infrastructure 106 may include switches, servers, storage devices, and networks (e.g., wireless networks, the Internet, landline telephone networks) that facilitate communications between the mobile computing devices 102 and 110.

Figure 2:
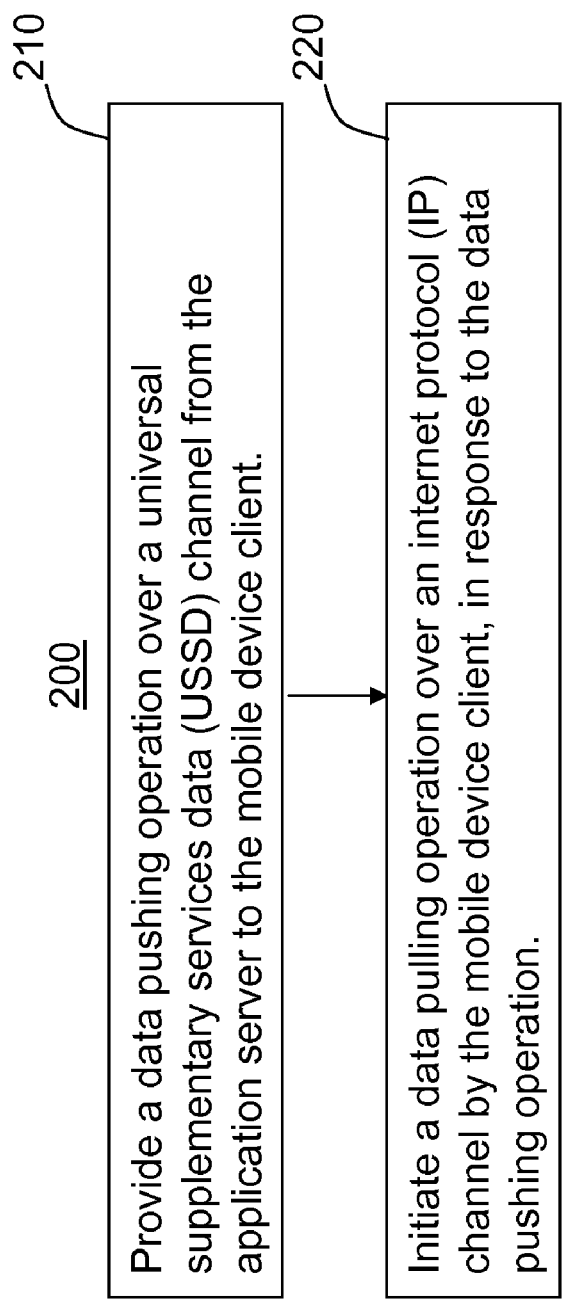
FIG. 2 is an exemplary block diagram of a method of using an USSD transport channel in a network and/or in connection with a mobile computing device, according to embodiments of the present invention.

FIG. 2 is an exemplary block diagram of a method of using an USSD transport channel in a network and/or in connection with a mobile computing device, according to embodiments of the present invention. In one embodiment of FIG. 2, a method 200 of saving energy in a mobile device client running an application in synchronous communication with an application server is disclosed. A second embodiment, includes the method 200 in connection with a network. The method 200 can include the steps of: providing a data pushing operation 210 over a universal supplementary services data (USSD) channel from the application server to the mobile device client; and initiating a data pulling operation 220 over an internet protocol (IP) channel by the mobile device client, in response to the pushing operation.

Advantageously, for short data transfers such as application server push notifications USSD message requires lower power drain than packet data, due to the longer time to transition to an RRC idle state after the data transfer is completed. Also, push notifications can be sent over USSD without an open IP session, thereby saving the client from having to maintain a persistent IP session. Stated differently, it is advantageous to use the unstructured supplemental services data (USSD) messaging protocols, to transport notification messages and critical data from the server to the mobile, to minimize power drain.

As background, USSD is a GSM service that allows circuit switched data communication between the subscribers and applications across a GSM network. USSD is defined in 3GPP TS 22.090. USSD is available as a legacy 2G service in 3G networks as well. Unlike SMS which is a store and forward based service, USSD is a session-oriented service. Unlike SMS, USSD provides immediate warranty delivery. USSD is already supported by GSM/GPRS/UMTS networks and handsets. It should be noted that there is precedent for networks to forward USSD messages to value added service providers via a USSD gateway device.

USSD messaging has the benefit of usually routing through the users home network even when the user is roaming, for example, operating in a visiting network. USSD messaging is thus inherently secure, as it is free of undesired traffic from unknown entities. USSD messaging can be initiated from the network, thereby allowing notifications and critical data to be sent from the application server to the mobile device client without an open IP session. Thus, the mobile device does not necessarily need to maintain a persistent IP session, which has several benefits. Firstly this allows the mobile device to close any IP sessions which are not actively being used to exchange data. This removes the possibility of the mobile device receiving malicious, spurious or otherwise undesired traffic over an open IP session during these times. For example, random traffic from the internet over a public IP address can cause unwanted current drain in the mobile device, even if these messages are subsequently ignored. Secondly the mobile device does not have to send periodic keep-alive messages to maintain the persistent IP session which eliminates current drain due to these. Thirdly, USSD messaging is more efficient for short messages such as notification of change and critical data from an application server.

An example of improved efficiency is as follows: On a 3G network a radio resource controller (RRC) typically controls the mobile to a dedicated channel (DCH) state for transmitting the USSD message. The benefit is that the RRC keeps the mobile in the DCH state for only about 2 seconds, which is sufficient time to send a keep-alive message and receive an acknowledgment, and the RRC immediately transitions the mobile from the DCH/FACH states back to the idle state after completion of the data transfer. Thus the total amount of time that the mobile stays in the DCH and FACH states is on the order of about 2 seconds. This compares favorably to the using a TCP/IP session wherein the amount of time spent in DCH may be typically in the range of 6 to 16 seconds, depending on the network setting. In one arrangement, the mobile device client has an associated home network having a mobile switching center (MSC), and the data pushing operation 210 includes the step of sending the application data from the application server to the home network MSC, as detailed in connection with FIG. 4. This is beneficial, as USSD is typically routed to and from the user's home network, per the USSD specification.

The immediately above sending step, can include at least one of: sending to the home network MSC using a public switched telephone network (PSTN) format; and sending to a USSD gateway connected to the home network MSC using an IP format. This is beneficial in that the USSD gateway device can be co-located with the MSC, on an operator's premises, for example. It can be a software module in the MSC or in the application server.

In more detail, in one arrangement, in the event that the mobile device client is operating on the home network, the sending step can further include: sending the application data from the home network MSC to a radio access network (RAN) and from the RAN to the mobile device client. In the event that the mobile device client is operating on a visiting network, the sending step can include sending the application data from the home network MSC to a visiting network MSC (V-MSC) and from the V-MSC to a visiting network radio access network (V-RAN) and from the V-RAN to the mobile device client. This is discussed in more detail in connection with FIG. 4. Advantageously, in this embodiment, the application server does not need to keep track of the mobile location. Thus, as long as the user is registered on a network somewhere, routing is taken care of by the home network which maintains a home location register (HLR) containing the current location and routing information for every network subscriber.

In one embodiment, the step of initiating a data pulling operation 220 includes initiating an internet IP data session over at least one of a wide area network and a wireless local area network (WLAN). The method 200 herein, does not constrain the client to use the cellular network for client initiated data exchanges. Thus, WLAN for example may require less energy for exchanging data.

In another embodiment, the step of initiating a data pulling operation 220 includes: opening the IP session, exchanging application data, and closing the IP session. Closing the IP session may be accomplished by sending a "close" token on the IP header, or it may be closed by refraining from additional communication, thereby allowing the session timeout to occur. Advantageously, closing the IP session prevents the mobile client from wasting energy to receive undesired IP messages. This is particularly helpful on networks which assign public IP addresses which can be accessed from anywhere. Even when private IP messages are assigned, the mobile client is subject to unwanted, possibly malicious, nuisance messages from within the network.

In another embodiment, the step of initiating a data pulling operation 220 can include the steps of: enabling a WLAN transceiver; employing the WLAN transceiver to open an IP session; exchanging application data between the application server and the mobile device client in the IP session; and disabling the WLAN after the data exchange is completed, thereby reducing energy consumption in the WLAN transceiver. An advantage of using WLAN, is that it has lower power drain when exchanging data. A potential disadvantage is that its power drain during standby mode is high, so it wastes energy during idle periods while waiting for push notifications from the application server. On the other hand, the power drain for the wide area network is low during standby, and mobile device user's tend to keep the wide are network active during idle periods in order to receive voice and messaging services. Thus WLAN can be used for efficiently "pulling" data from the data server, but is less efficient in idle mode if a persistent IP session is to be maintained. Eliminating "push" notifications from being received over a persistent IP session via WLAN allows the WLAN to be disabled during idle periods, thereby eliminating the disadvantage of using WLAN when the mobile device is waiting for push notifications. Another advantage is that WLAN uses unlicensed spectrum, thereby freeing the spectrum of the wide area network for other purposes.

In yet another embodiment, the data pulling operation can be sent via at least one of a wired network communication mode, a wireless local area network communication mode, a wireless mesh network communication mode, and an optical network communication mode. Thus applications can be efficiently run in synchronous communications without maintaining a persistent IP session.

In connection with the providing a data pushing operation 210, this step can be accomplished in one embodiment, without a persistent IP session, thereby eliminating spurious IP messages and reducing mobile device power drain. Spurious IP messages can cause significant undesirable power drain, especially on networks assigning routable IP addresses, and employing long RRC transition timers between active and to idle states.

In another embodiment, the providing step 210 can include a pushing operation which includes sending from the application server to the mobile device a notification of change pertaining to the application, and the initiating step 220 includes the mobile device initiating a transfer of application data in response to the notification. For example, an email application may provide notification that something has changed, such as messages have arrived, and the mobile device client may optionally download email messages after receiving the notification. In another example, social networking applications provide an indication that something has changed, such as the status of a person in a user's social network, and the mobile device client may optionally download the person's status after receiving the notification.

Likewise, the providing step 210 can include a pushing operation which includes sending from the application server to the mobile device critical data pertaining to the application. Critical data can be application data or other status information, which is not usually optional for the user to receive. Thus, advantageously, it requires less power drain in the mobile device to receive critical data as a push, since there is more signaling involved in receiving a notification that there is critical data and following up with a request for the server to send the data.

Figure 3:
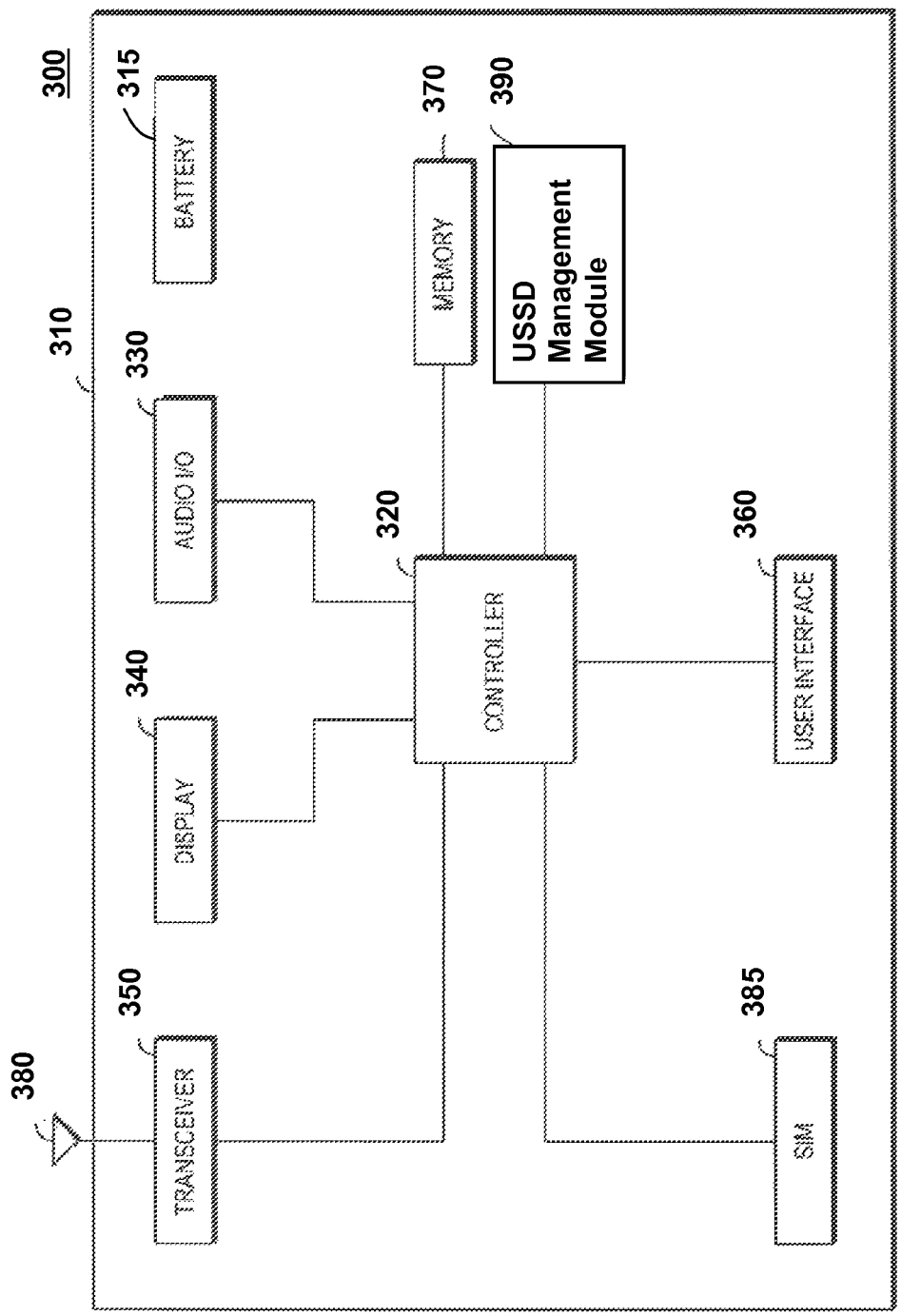
FIG. 3 is a block diagram of a mobile computing device with an USSD management module, that provides for an improved battery life, according to an embodiment of the present invention.

Referring now to FIG. 3, there is shown an exemplary block diagram of a mobile computing device 300, such as the mobile computing devices 102 or 110, according to one embodiment. The mobile computing device 300 can include a housing 310, an energy storage device 315, a controller 320 coupled to the housing 310, audio input and output circuitry 330 coupled to the housing 310, a display 340 coupled to the housing 310, one or more transceivers 350 coupled to the housing 310, a user interface 360 coupled to the housing 310, a memory 370 coupled to the housing 310, an antenna 380 coupled to the housing 310, and a removable subscriber identity module (SIM) 385 coupled to the controller 320. The mobile computing device 300 employs the controller 320 and memory 370 to run applications in synchronous communication with and application server via transceiver 350. The mobile computing device 300 further includes a USSD management module 390, coupled to the controller 320. In more detail, the USSD management module 390 can reside within the controller 320, can reside within the memory 370, can reside within the SIM 385, can be an autonomous module, can be an application, can be software, can be hardware, or can be in any other format useful for a module on a wireless communication device 300. In one embodiment, the USSD management module 390 can be defined as a controller for coordinating application server communication for each application.

The display 340 can be a liquid crystal display (LCD), a light emitting diode (LED) display, a plasma display, or any other means for displaying information. The transceiver 350 may include a transmitter and/or a receiver. The audio input and output circuitry 330 can include a microphone, a speaker, a transducer, or any other audio input and output circuitry. The user interface 360 can include a keypad, buttons, a touch pad, a joystick, an additional display, or any other device useful for providing an interface between a user and an electronic device. The memory 370 may include a random access memory, a read only memory, an optical memory or any other memory that can be coupled to a wireless communication device.

In more detail, in one embodiment, the mobile computing device 300 with an energy storage device in FIG. 3, includes: a housing 310; a controller 320 coupled to the housing 310, the controller 320 configured to applications in synchronous communication from one or more application servers; memory 370 coupled to the controller 320; a wireless transceiver 350 coupled to the controller 320 for synchronizing application data between the mobile computing device 300 and the one or more application servers (which could reside in infrastructure 106 in FIG. 1); and an USSD management module 390, configured to: receive a data pushing operation over a universal supplementary services data (USSD) channel from the application server to the mobile device client; and initiate a data pulling operation over an internet protocol (IP) channel by the mobile device client, in response to the pushing operation. This arrangement can provide a longer useful life for mobile computing devices before having to recharge a user's power storage device 215.

In one embodiment, the instant invention is incorporated into the communication infrastructure and in another it can be incorporated into a wireless communication device. More specifically, the USSD management module 390 may be incorporated into a mobile computing device 300 or alternatively into the infrastructure 106. Other placements are possible, such as including being in both.

Figure 4:
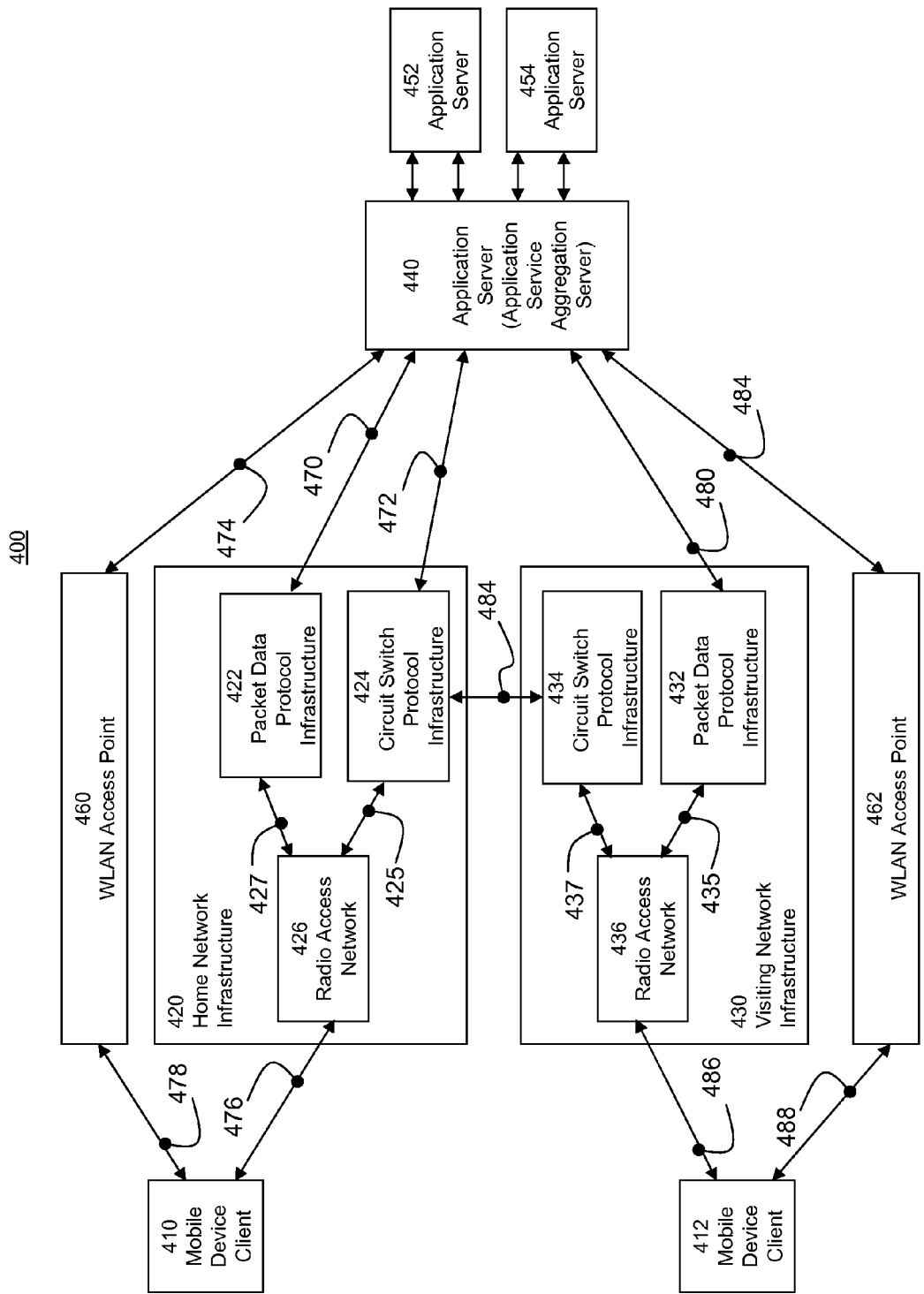
FIG. 4 is a block diagram of a wide area network showing mobile device clients operating on a home and visiting networks, with a mobile device client running an application in synchronous communication with an application server, according to an embodiment of the present invention.

Referring to FIG. 4, a more detailed example of a system with efficient server communication for increasing the battery life of a mobile computing device, is described. The system 400 includes first and second mobile device clients 410 and 412 running applications in synchronous communication with application server 440. Application server 440 may run local applications, and it may be an application service aggregation server, for aggregating data communications between the mobile device client 410 and other application servers 452, 454.

The client/server communication may occur over a home wide area network (WAN) 420. In a preferred embodiment, the WAN 420 is a global system for mobile communications universal mobile telecommunications system (GSM/UMTS) network. The home network infrastructure 420 includes a packet data protocol infrastructure 422 which in a preferred embodiment comprises a UMTS terrestrial radio access network (UTRAN). The home network infrastructure 420 also includes a circuit switched infrastructure 424, which in a preferred embodiment includes a mobile switching center (MSC). The MSC is the legacy circuit switch part of the GSM/UMTS network. The home network infrastructure 420 also includes a radio access network (RAN) 426, which in a preferred embodiment comprises a radio frequency base station (BS) and base station controller (BSC). The application server 440 communicates packet data to the packet data protocol infrastructure 422 using a TCP/IP protocol connection 470, and to the circuit switch protocol infrastructure 424 using USSD protocol public switch telephone network (PSTN) connection 472. In alternative embodiment, the circuit switch protocol infrastructure 424 may include a USSD gateway device (not shown), in which case the connection between the application server 440 and the circuit switch protocol infrastructure may employ a TCP/IP protocol, or some other protocol. The packet data protocol infrastructure 422 and circuit switch protocol infrastructure 424 connect to the RAN (426) via network connections 425 and 427, respectively. The RAN connects to the mobile device client 410 via wireless connection 476.

The communication between mobile device client 410 and application server 440 may also occur over wireless local area network (WLAN) access point 460, such as an 802.11 access point. The application server 440 communicates packet data to the WLAN access point using a TCP/IP protocol connection 474. The WLAN access point connects to the mobile device client 410 via wireless connection 478.

Continuing, the system 400 in FIG. 4, includes a first mobile device client 410 running applications in synchronous communication with application server 440. Application server 440 may run stand-alone applications, and it may be an application service aggregation server, for aggregating data communications between the mobile device client 410 and stand alone application servers 452, 454.

The communication between mobile device client 412 and application server 440 may occur over a visiting WAN 430. The visiting WAN may be a GSM/UMTS network operated by a different business entity than the business entity which operates the home WAN 420. The visiting network infrastructure 430 includes a packet data protocol infrastructure 422 which in a preferred embodiment comprises a UTRAN. The visiting network infrastructure 430 also includes a circuit switched infrastructure 434, which in a preferred embodiment includes an MSC (not shown). The visiting network infrastructure 430 also includes a radio access network (RAN) 436 which in a preferred embodiment comprises a base station (BS) and base station controller (BSC). The application server 440 communicates packet data to the packet data protocol infrastructure 432 using a TCP/IP protocol connection 480. The application server 440 communicates to the circuit switch protocol infrastructure 434 via home circuit switch protocol infrastructure 424 using USSD protocol public switch telephone network (PSTN) connections 472 and 484. The packet data protocol infrastructure 432 and circuit switch protocol infrastructure 434 connect to the RAN (436) via network connections 435 and 437 respectively. The RAN connects to the mobile device client 412 via wireless connection 486.

The communication between mobile device client 412 and application server 440 may occur over a second wireless local area network (WLAN) access point 462, such as an 802.11 access point. The application server 440 communicates packet data to the WLAN access point 462 using a TCP/IP protocol connection 484. The WLAN access point connects to the mobile device client 412 via wireless connection 488.

In a first embodiment, the mobile device is registered on the home network 420 and does not have WLAN access. In the providing step 210, application server 440 sends, or "pushes" notification about a change in an application over a USSD protocol public switched telephone network (PSTN) connection 472 to circuit switch protocol infrastructure 424, which in turn is routed to RAN 426 via connection 425, and on to the mobile client 410 via wireless connection 474. (Alternatively, the step 220 can be referred to as being "received" by the mobile device client 300 and the USSD management module, in FIG. 3.)

In the initiating step 220, the mobile device 410 can request, or "pull", application data exchange related to the notification. The request occurs over the wireless connection 476 to the RAN 426, which in turn is routed on network connection 427 to the packet data protocol infrastructure 422, and on to the application server 440 via a TCP/IP connection 470. In this way the mobile device can close the TCP/IP session used for exchanging application data and still receive critical data and change notifications in communications initiated from the application server.

In a second embodiment, the mobile device is registered on the home network 420 and has access to WLAN access point 460. In the providing step 210, application server 440 sends, or "pushes" notification about a change in an application over a USSD protocol public switched telephone network (PSTN) connection 472 to circuit switch protocol infrastructure 424, which in turn is routed the notification to the RAN via connection 425, and on to the mobile client 410 via wireless connection 474. In the initiating step 220, the mobile device 410 requests, or "pulls", an application data exchange related to the notification. The exchange occurs over a wireless TCP/IP connection 478 to the WLAN 460, which in turn is routed to the application server 440 via a TCP/IP connection 474. Upon completion of the exchange of application data the mobile device 410 may close the TCP/IP connection and control its WLAN transceiver in a low power mode. In this way, the mobile device can use a LAN, which may be more efficient for exchanging large amounts of application data, for "pulling" of application data, while using the WAN which may be more efficient for receiving critical data and change notifications from the application server.

In a third embodiment, the mobile device 412 is registered on a visiting network 430 and does not have WLAN access. In the providing step 210, application server 440 sends, or "pushes" notification about a change in an application over a USSD protocol public switched telephone network (PSTN) connection 472 to home network 420 circuit switch protocol infrastructure 424, which in turn is routed to RAN 436 via connection 435, and on to the mobile client 412 via wireless connection 486. In the initiating step 220, the mobile device 412 requests, or "pulls", an application data exchange related to the notification. The exchange occurs over the wireless connection 486 to the RAN 436, which in turn is routed on network connection 435 to the packet data protocol infrastructure 432, and on to the application server 440 via a TCP/IP connection 480. Thus, energy savings in the mobile device can be attained by using USSD transport for push notifications in situations where the mobile device is roaming on a visiting WAN.

In a fourth embodiment, the mobile device 412 is registered on the visiting network 430 and has access to WLAN access point 462. In the providing step 210, application server 440 sends, or "pushes" notification about a change in an application over a USSD protocol public switched telephone network (PSTN) connection 472 to home network 420 circuit switch protocol infrastructure 424, which in turn is routed to RAN 436 via connection 435, and on to the mobile client 412 via wireless connection 486. In the initiating step 220 the mobile device 412 requests, or "pulls", an application data exchange related to the notification. The request occurs over the wireless TCP/IP connection 488 to the WLAN 462, which in turn is routed to the application server 440 via a TCP/IP connection 484. Upon completion of the exchange of application data the mobile device 412 may close the TCP/IP connection and control its WLAN transceiver to a low power mode. In this way the mobile device can use a LAN, which may be more efficient for exchanging large amounts of application data, for "pulling" of application data, while using USSD transport for push notifications in situations where the mobile device is roaming on a visiting WAN.

Consequently, the mobile computing device can utilize a variety of power-consuming applications and services, while maintaining and improving the lifetime of an energy storage device of a mobile computing device. Because of the method, structure and disclosed approaches detailed herein, the user experience can be significantly enhanced.

In a preferred embodiment, voice communications and short message service communications are not affected by the closing of PDP contexts, since these can employ the circuit switched infrastructure 424 in the wireless infrastructure 420, not requiring a PDP context.

The term application, as used herein, can include at least one of email, instant messaging, social networking, news feeding, gaming, media uploading (e.g. photo uploading), media downloading (e.g. music downloading), and data backup, or any other application requiring data synchronization or otherwise having regular communication with an application server.

Those skilled in the art will recognize that a wide variety of modifications, alterations, and combinations can be made with respect to the above described embodiments without departing from the broad scope of the invention, and that such modifications, alterations, and combinations are to be viewed as being within the scope of the invention.

The invention claimed is:

1. A method of saving energy in a mobile device client running an application in synchronous communication with an application server comprising the steps of:
    providing a data pushing operation over a universal supplementary services data (USSD) channel from the application server to the mobile device client; and
    initiating a data pulling operation over an internet protocol (IP) channel by the mobile device client, in response to the pushing operation,
    wherein the providing step includes a pushing operation which includes sending from the application server to the mobile device client a notification of change pertaining to the application, and the initiating step includes the mobile device client initiating a transfer of application data in response to the notification.

2. The method of claim 1 wherein the mobile device client has an associated home network having a mobile switching center (MSC) and the pushing operation includes the step of sending the application data from the application server to the home network MSC.

3. The method of claim 2 wherein the sending step includes at least one of:
   sending to the home network MSC using public switched telephone network (PSTN) format; and
   sending to a USSD gateway connected to the home network MSC using an IP format.

4. The method of claim 2 wherein, when the mobile device client is operating on the home network, the sending step further includes: sending the application data from the home network MSC to a radio access network (RAN) and from the RAN to the mobile device client.

5. The method of claim 2 wherein, when the mobile device client is operating on a visiting network, sending the application data from the home network MSC to a visiting network MSC (V-MSC) and from the V-MSC to a visiting network radio access network (V-RAN) and from the V-RAN to the mobile device client.

6. The method of claim 1 wherein the initiating step includes initiating an internet IP data session over at least one of a wide area network and a wireless local area network (WLAN).

7. The method of claim 1 wherein the initiating step includes the steps of:
   opening the IP session, exchanging application data, and closing the IP session.

8. The method of claim 1 where the initiating step includes the steps of: enabling a WLAN transceiver; employing the WLAN transceiver to open an IP session; exchanging application data between the application server and the mobile device client in the IP session;
   and disabling the WLAN after the data exchange is completed, thereby reducing energy consumption in the WLAN transceiver.

9. The method of claim 1 wherein the providing step is without a persistent IP session, eliminating spurious IP messages and thereby reducing mobile device power drain.

10. The method of claim 1 wherein the providing step further includes a pushing operation which includes sending from the application server to the mobile device client a critical data pertaining to the application.

11. A mobile computing device, comprising:
   a housing;
   a controller coupled to the housing, the controller configured to run applications in synchronous communication from one or more application servers;
   memory coupled to the controller;
   a wireless transceiver coupled to the controller for synchronizing application data between the mobile computing device and the one or more application servers; and
   an USSD management module configured to: receive a data pushing operation over a universal supplementary services data (USSD) channel from the application server to the mobile device client; and initiate a data pulling operation over an internet protocol (IP) channel by the mobile device client, in response to the pushing operation, wherein the receipt of data pushing operation includes a pushing operation which includes sending from the application server to the mobile device client a notification of change pertaining to the application, and the initiating of a data pulling operation includes the mobile device client initiating a transfer of application data in response to the notification.

12. A method in a network for helping to save energy in a mobile device client running an application in synchronous communication with an application server comprising the steps of:
   providing a data pushing operation over a universal supplementary services data (USSD) channel from the application server to the mobile device client; and
   initiating a data pulling operation over an internet protocol (IP) channel by the mobile device client, in response to the pushing operation,
   wherein the providing step includes a pushing operation which includes sending from the application server to the mobile device client a notification of change pertaining to the application, and the initiating step includes the mobile device client initiating a transfer of application data in response to the notification.

13. The method of claim 12 wherein the mobile device client has an associated home network having a mobile switching center (MSC) and the pushing operation includes the step of sending the application data from the application server to the home network MSC.

14. The method of claim 13 wherein the sending step includes at least one of:
   sending to the home network MSC using public switched telephone network (PSTN) format; and
   sending to a USSD gateway connected to the home network MSC using an IP format.

15. The method of claim 13 wherein, when the mobile device client is operating on the home network, the sending step further includes: sending the application data from the home network MSC to a radio access network (RAN) and from the RAN to the mobile device client.

16. The method of claim 13 wherein, when the mobile device client is operating on a visiting network, sending the application data from the home network MSC to a visiting network MSC (V-MSC) and from the V-MSC to a visiting network radio access network (V-RAN) and from the V-RAN to the mobile device client.

17. The method of claim 12 wherein the initiating step includes initiating an internet IP data session over at least one of a wide area network and a wireless local area network (WLAN).

18. The method of claim 12 wherein the initiating step includes the steps of:
   opening the IP session, exchanging application data, and closing the IP session.

19. The method of claim 12 where the initiating step includes the steps of:
   enabling a WLAN transceiver; employing the WLAN transceiver to open an IP session;
   exchanging application data between the application server and the mobile device client in the IP session; and disabling the WLAN after the data exchange is completed, thereby reducing energy consumption in the WLAN transceiver.

* * * * *